United States Patent [19]
Bencic

[11] Patent Number: 5,797,708
[45] Date of Patent: Aug. 25, 1998

[54] UNIVERSAL DRILL GUIDE

[76] Inventor: Stjepan Bencic, 72-06 73rd Pl., Glendale, N.Y. 11385

[21] Appl. No.: 831,818

[22] Filed: Apr. 2, 1997

[51] Int. Cl.$^6$ ............................................. B23B 45/14
[52] U.S. Cl. .................. 408/112; 408/103; 408/106; 408/108; 408/109; 408/115 R; 408/135; 408/712
[58] Field of Search ............... 408/110–112, 135, 408/712, 103–109, 72 R, 115 R, 241 R; 173/170

[56] References Cited

U.S. PATENT DOCUMENTS

| | | | |
|---|---|---|---|
| 1,647,396 | 11/1927 | Decker | 408/241 R |
| 2,454,372 | 11/1948 | Billeter | 408/241 R |
| 2,849,900 | 9/1958 | Heidtman, Jr. | 408/112 |
| 4,242,016 | 12/1980 | Faris | 408/712 |
| 5,051,044 | 9/1991 | Allen | 408/135 |

*Primary Examiner*—Steven C. Bishop
*Attorney, Agent, or Firm*—Michael I. Kroll

[57] ABSTRACT

A universal drill guide (10) comprising a base (12) being a frame-like configuration having a large central opening. A pair of elongated columns (14) are provided. A structure (16) is for pivotally mounting lower ends of the elongated columns (14) parallel to opposite sides of the base (12), so that the elongated columns (14) can go from upright positions to angled positions. A cross slide (18) rides upon the elongated columns (14). A bearing spindle assembly (20) is rotatively carried centrally within the cross slide (18). A guide chuck (22) is connected to the bearing spindle assembly (20) above the base (12). An adjustable cradle (24) is affixed to the cross slide (18) to hold an electric drill (26) in a stationary position, so that the drill chuck (28) can engage with the bearing spindle assembly (20) above the cross slide (18). A facility (30) is between the cross slide (18) and the elongated columns (14), for moving the cross slide (18) up and down on the elongated columns (14). A handle assembly (32) extends upwardly from the elongated columns (14) to allow a person to grip the handle assembly (32) when operating the universal drill guide (10), so as to drill vertical and angled holes in different shaped work pieces.

11 Claims, 16 Drawing Sheets

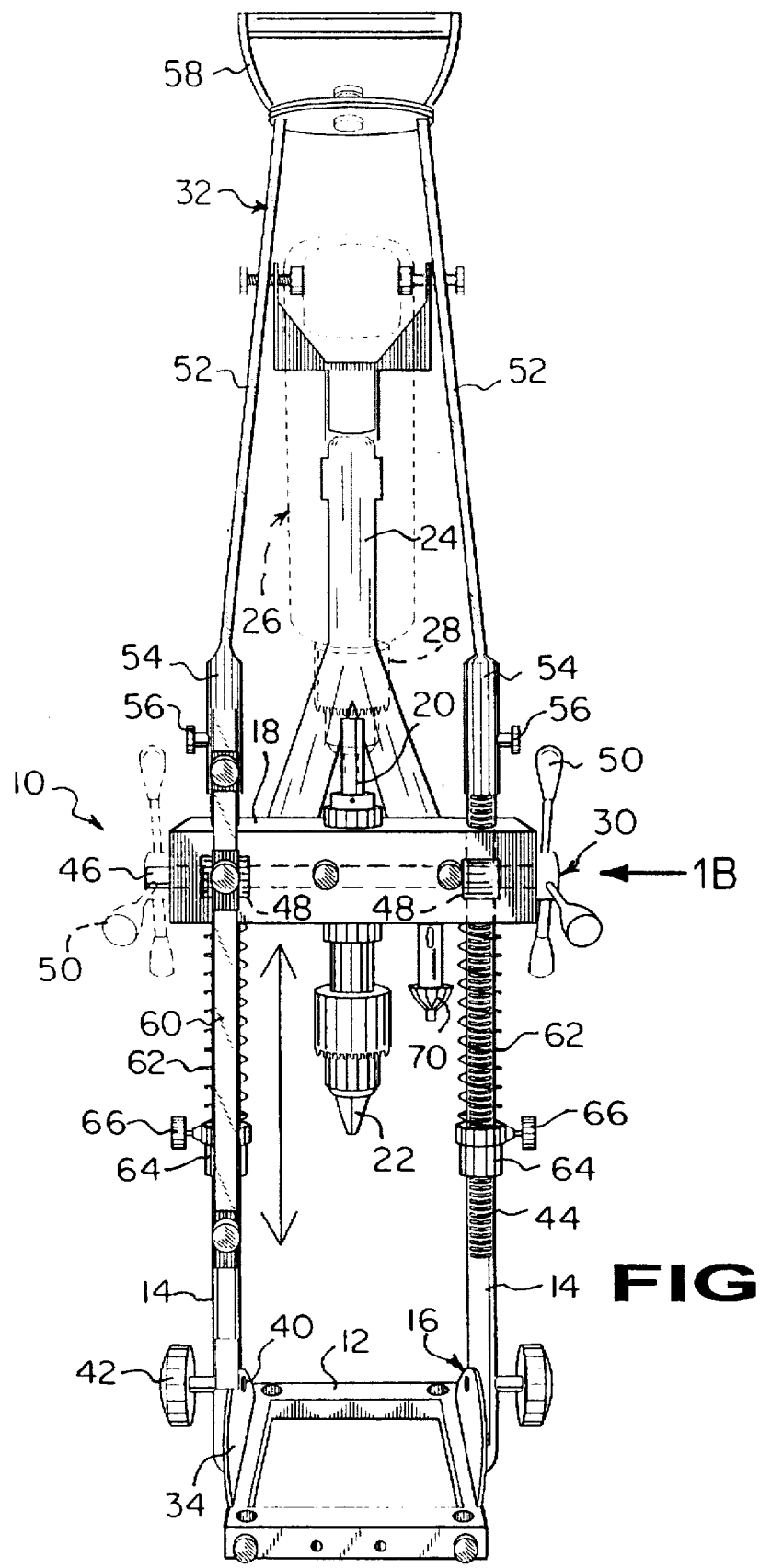

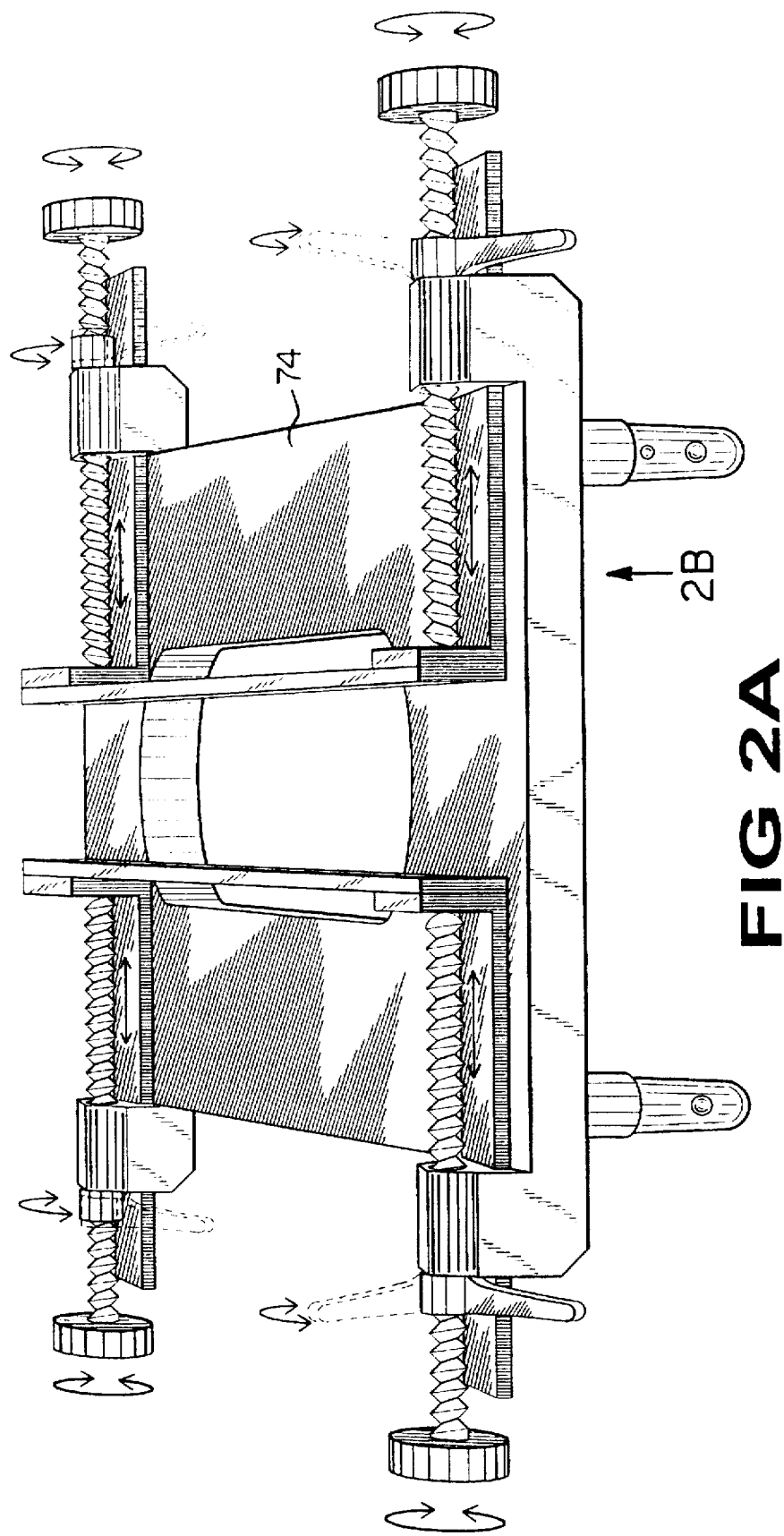

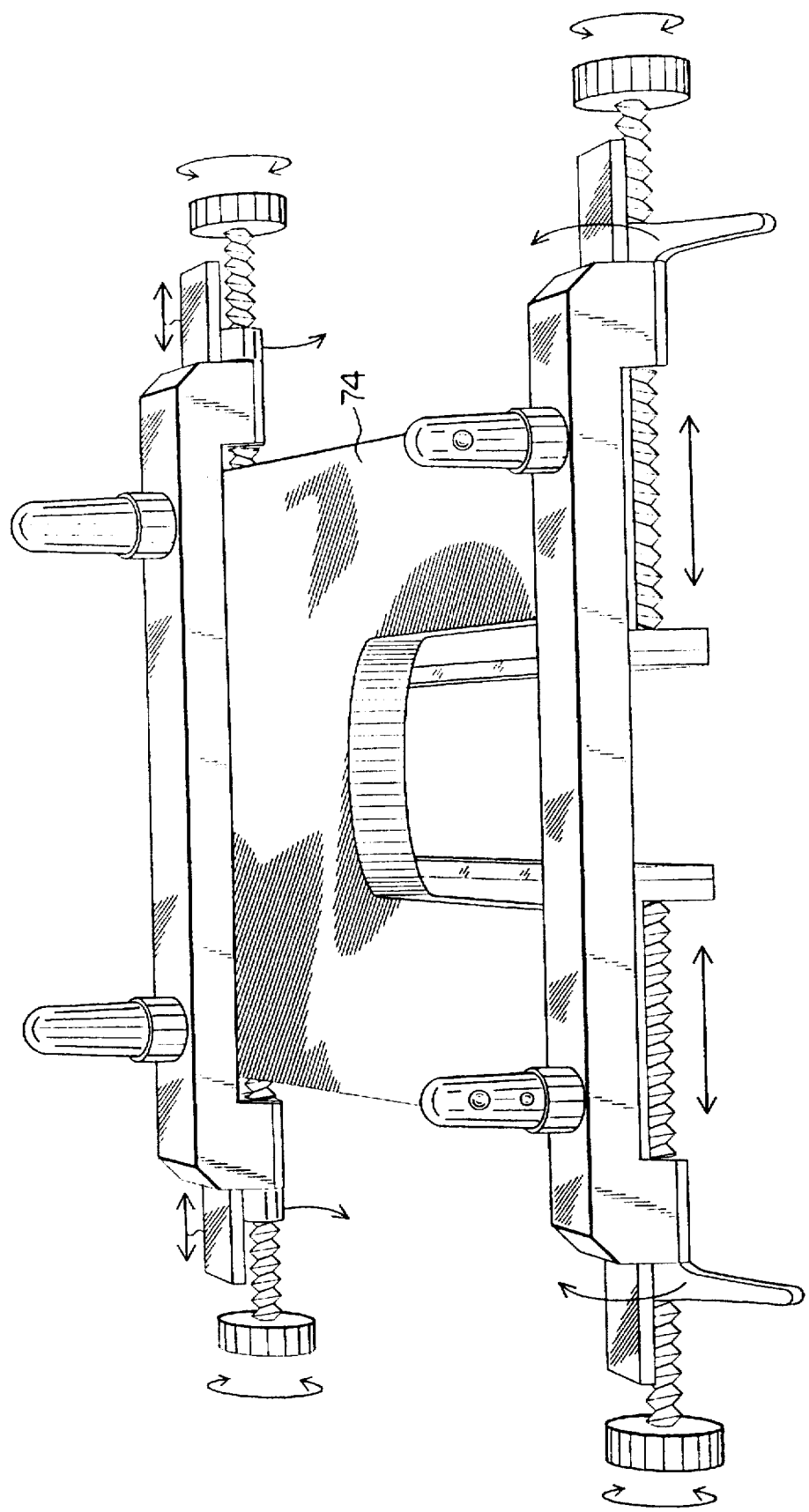

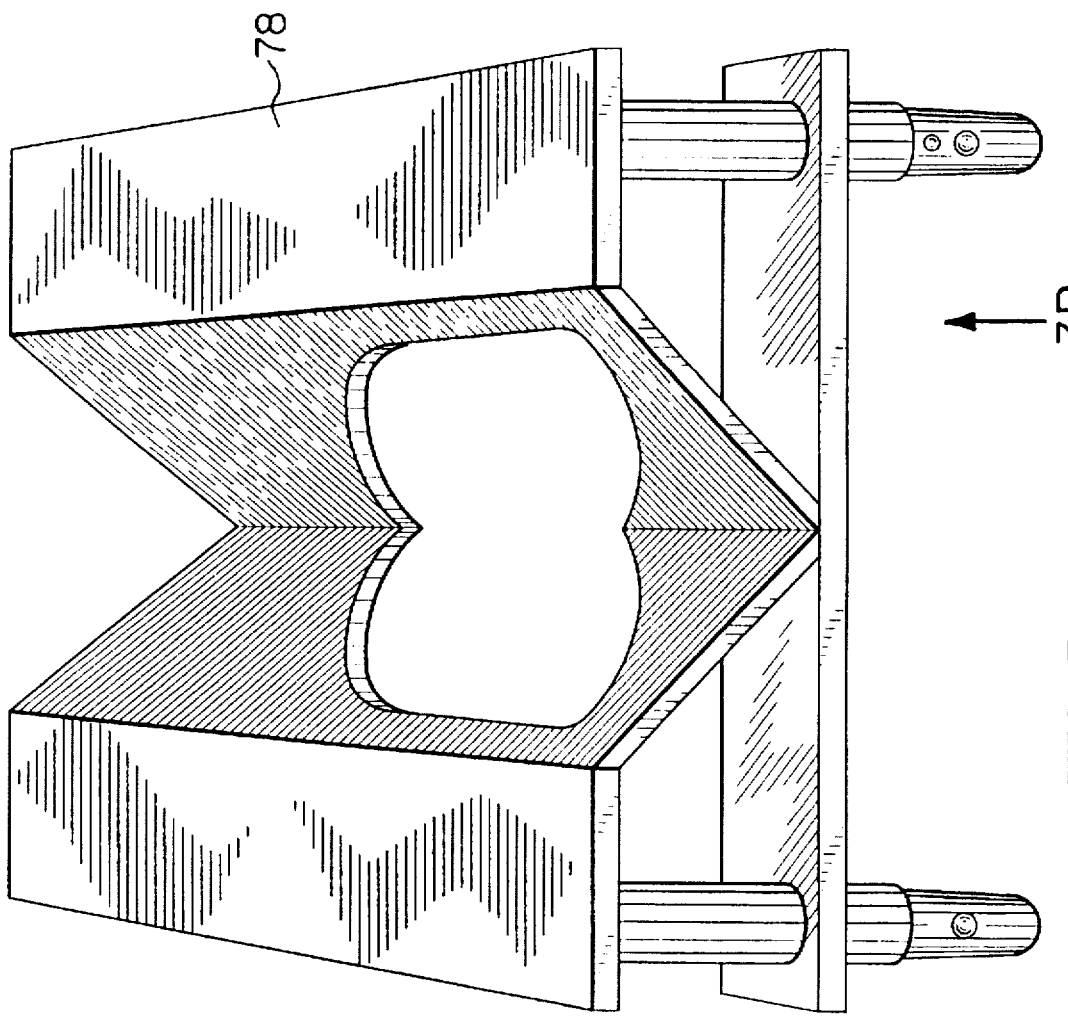

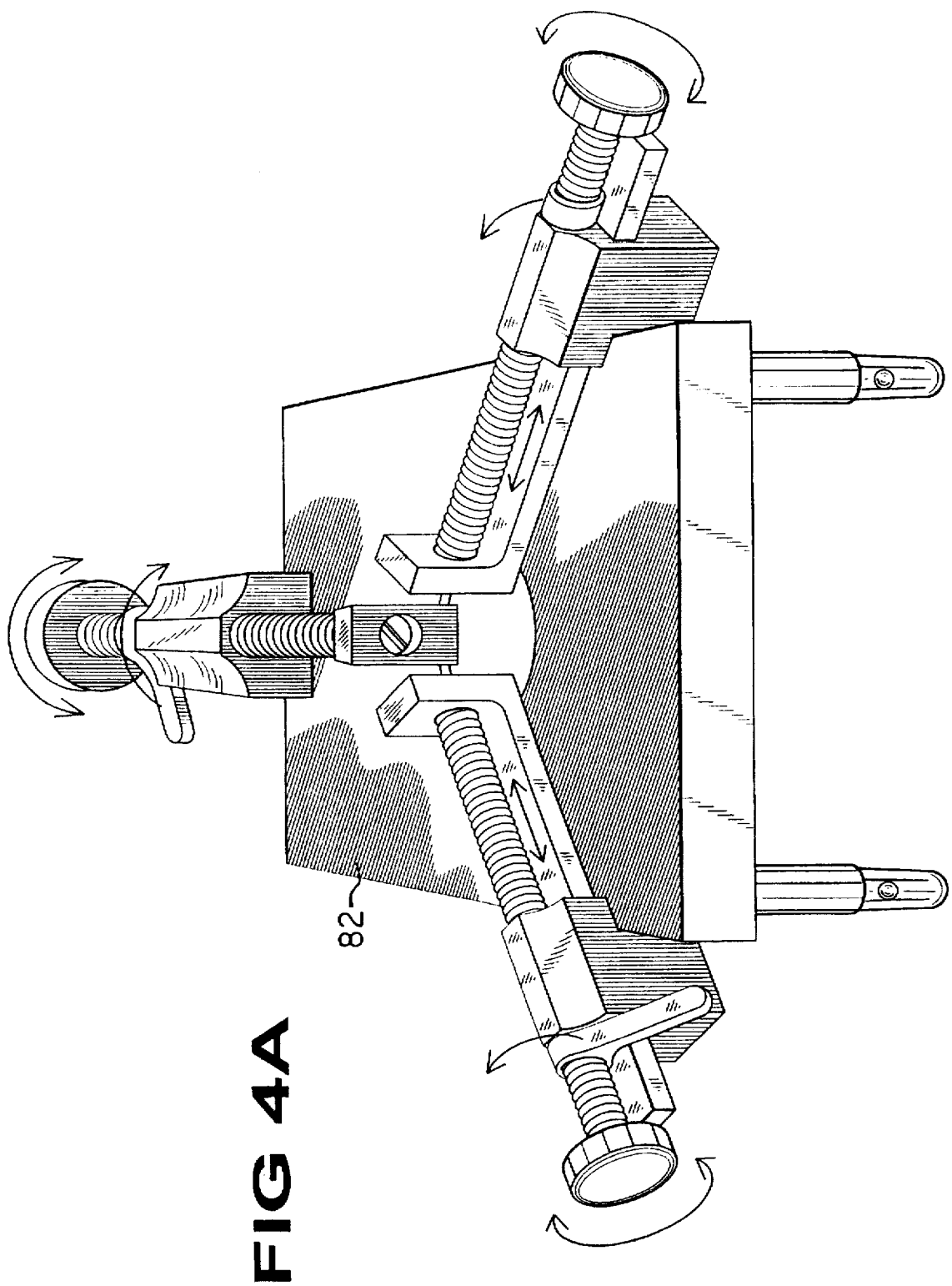

5,797,708

1
UNIVERSAL DRILL GUIDE

BACKGROUND OF THE INVENTION

1. Field of the Invention

The instant invention relates generally to electric drill stands and more specifically it relates to a universal drill guide. The universal drill guide is an extremely versatile tool, that will perform various drilling tasks with an electric drill secured thereto.

2. Description of the Prior Art

Numerous electrical drill stands have been provided in prior art that are adapted to convert electric drills into drill presses, while permitting greater control and accuracy in drilling operations. Handle levers drill up and down, multiply, pressure smoothly and easily, while provided control and accuracy. Some drill stands adjust to any angle by tilting the table. Some work in two positions being vertical or horizontal. While these units may be suitable for the particular purpose to which they address, they would not be as suitable for the purposes of the present invention as heretofore described.

SUMMARY OF THE INVENTION

A primary object of the present invention is to provide a universal drill guide that will overcome the shortcomings of the prior art devices.

Another object is to provide a universal drill guide that is an extremely versatile tool, which will secure an electric drill thereto to perform various drilling tasks.

An additional object is to provide a universal drill guide that can take different shaped pieces of work stock to drill vertical and angled holes therein.

A further object is to provide a universal drill guide that is simple and easy to use.

A still further object is to provide a universal drill guide that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1A is a front perspective view of the instant invention.

Figure 2C:
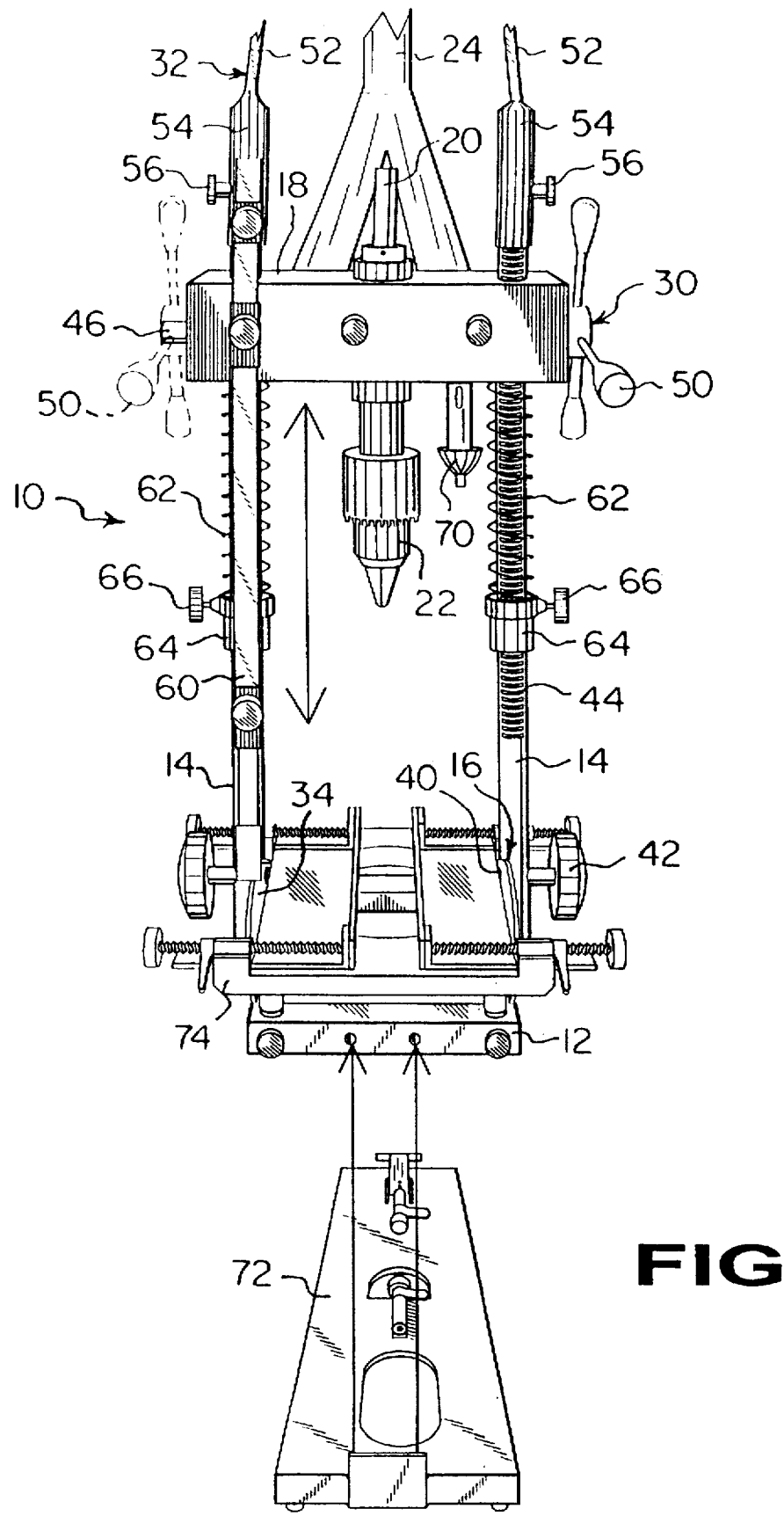
FIG. 2A is a top perspective view of a horizontal bracket clamp assembly for rectangular shaped work stock pieces.
FIG. 2B is a bottom perspective view taken in the direction of arrow 2B in FIG. 2A.

2
FIG. 2C is a front perspective view of the instant invention with the upper portion broken away, showing the horizontal bracket clamp assembly mounted to the top of the base and the platform ready to be mounted to the bottom of the base.

Figure 2D:
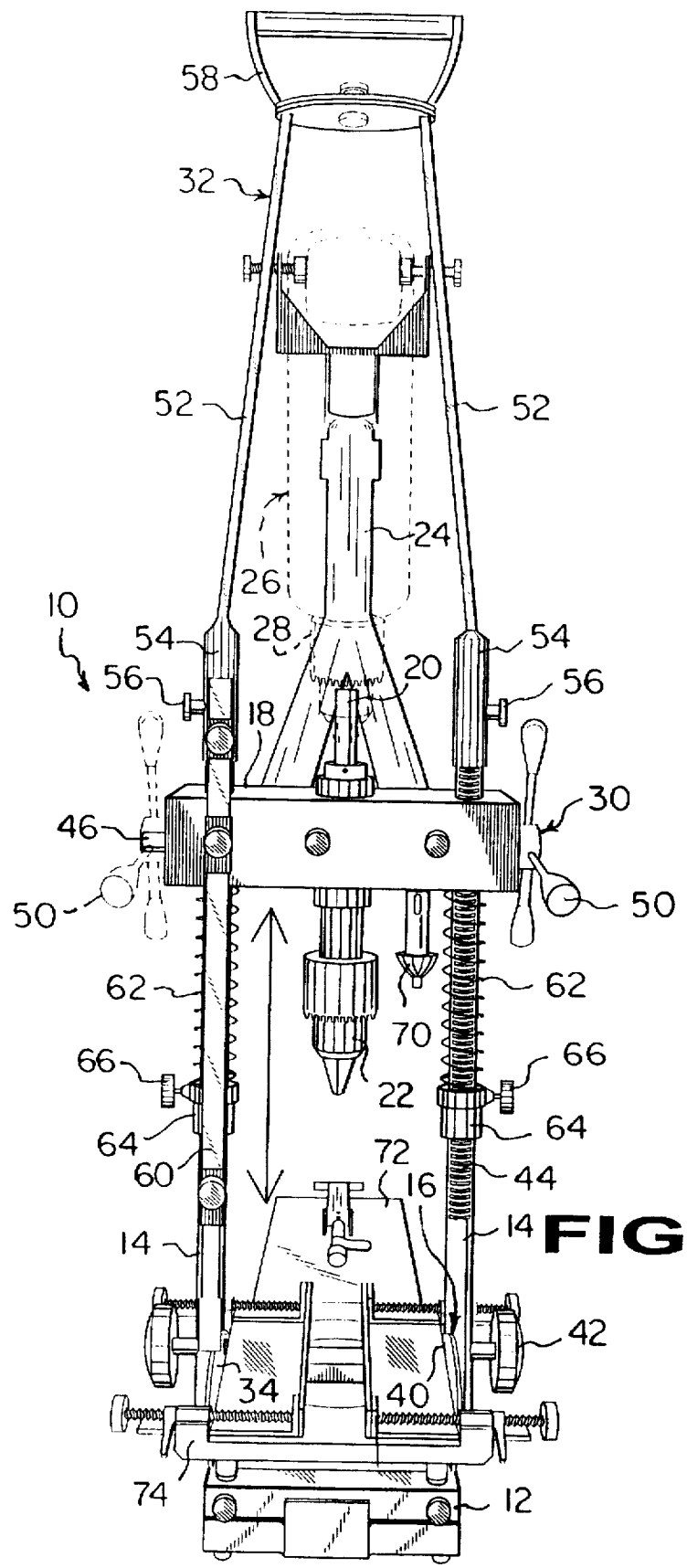

FIG. 2D is a front perspective view similar to FIG. 2C, showing the entire instant invention with the platform mounted to the bottom of the base.

Figure 2E:
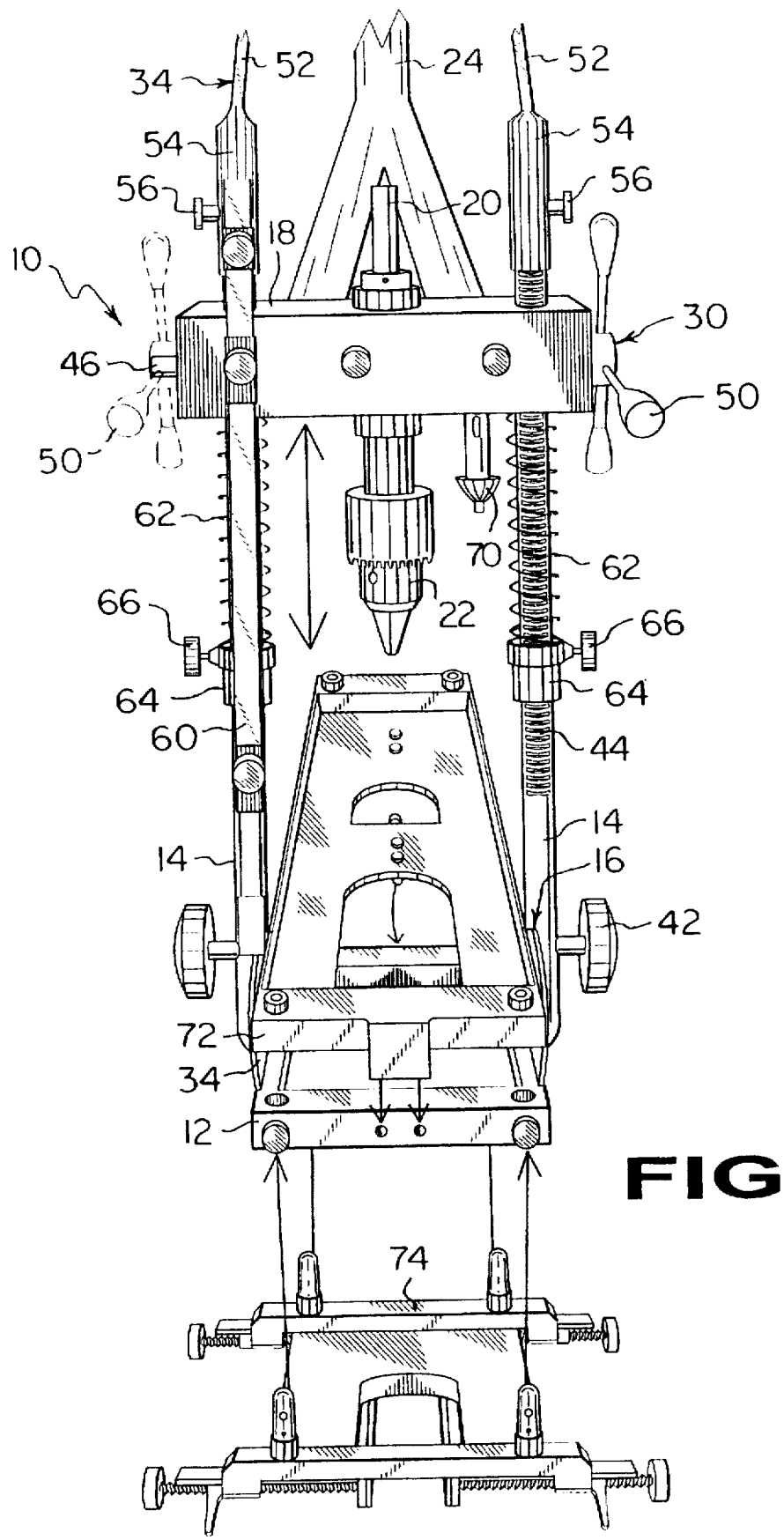

FIG. 2E is a front perspective view similar to FIG. 2C, showing the platform inverted ready to be mounted to the top of the base and the horizontal bracket clamp assembly inverted ready to be mounted to the bottom of the base.

Figure 2F:
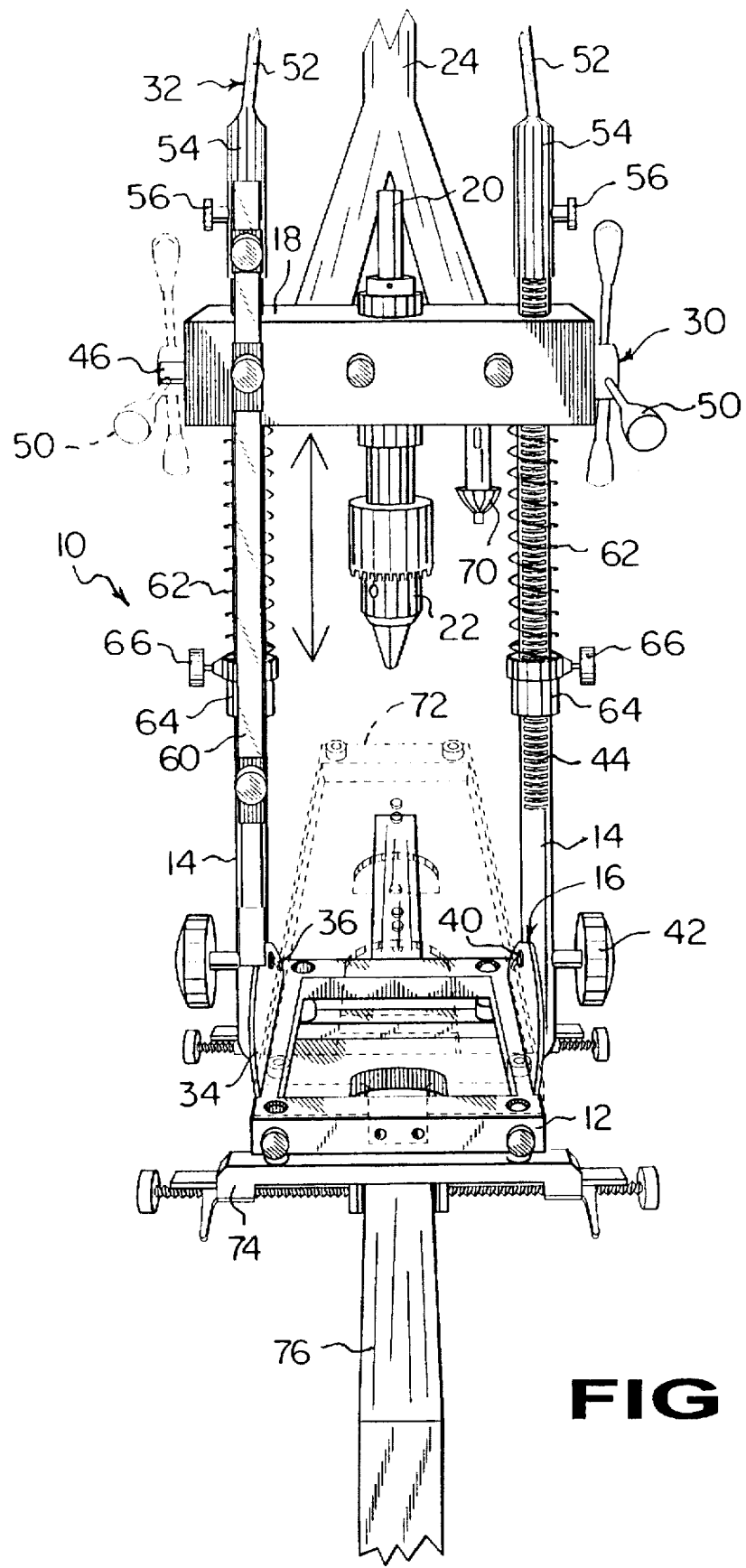

FIG. 2F is a front perspective view similar to FIG. 2E, showing the platform inverted and in phantom mounted to the top of the base and the horizontal bracket clamp assembly inverted and mounted to the bottom of the base, holding a rectangular shaped work stock piece horizontally thereto.

FIG. 3A is a top perspective view of a horizontal bracket holder for cylindrical shaped work stock pieces.

Figure 3B:
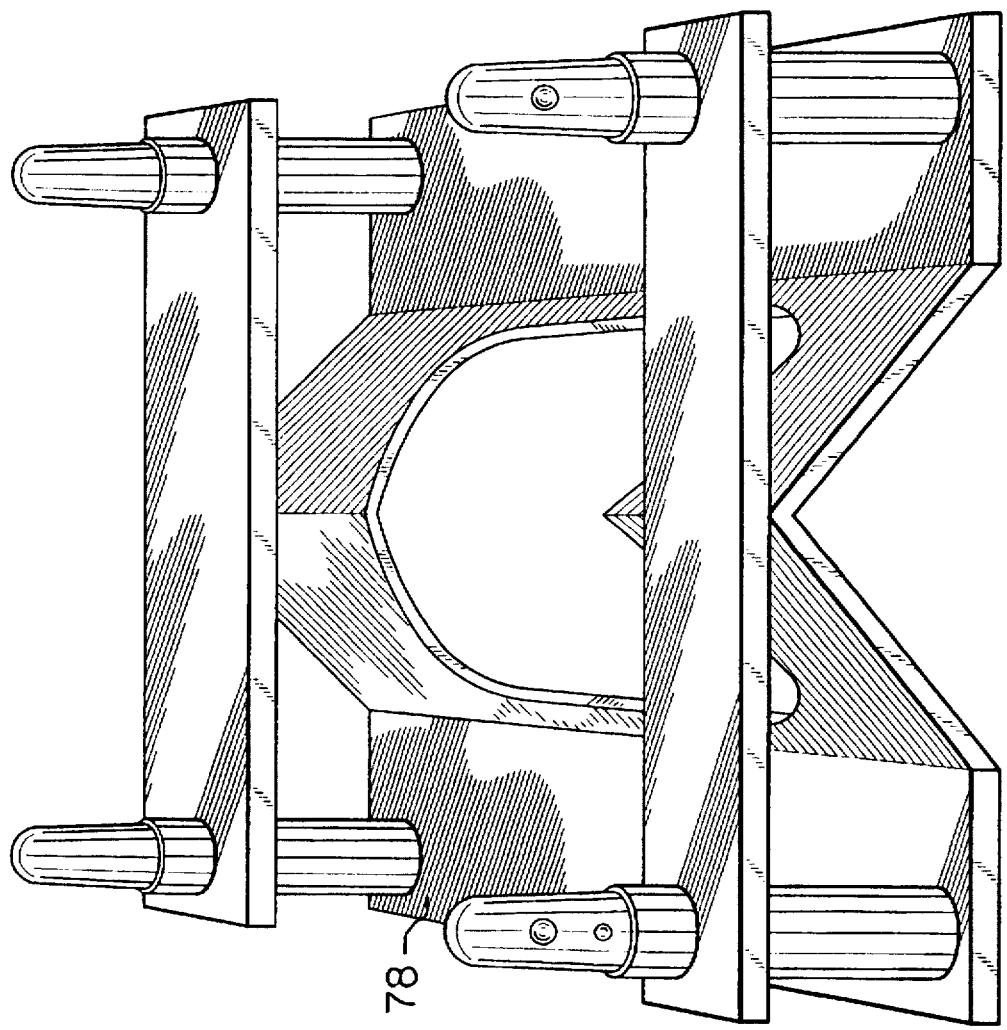

FIG. 3B is a bottom perspective view taken in the direction of arrow 3B in FIG. 3A.

Figure 3C:
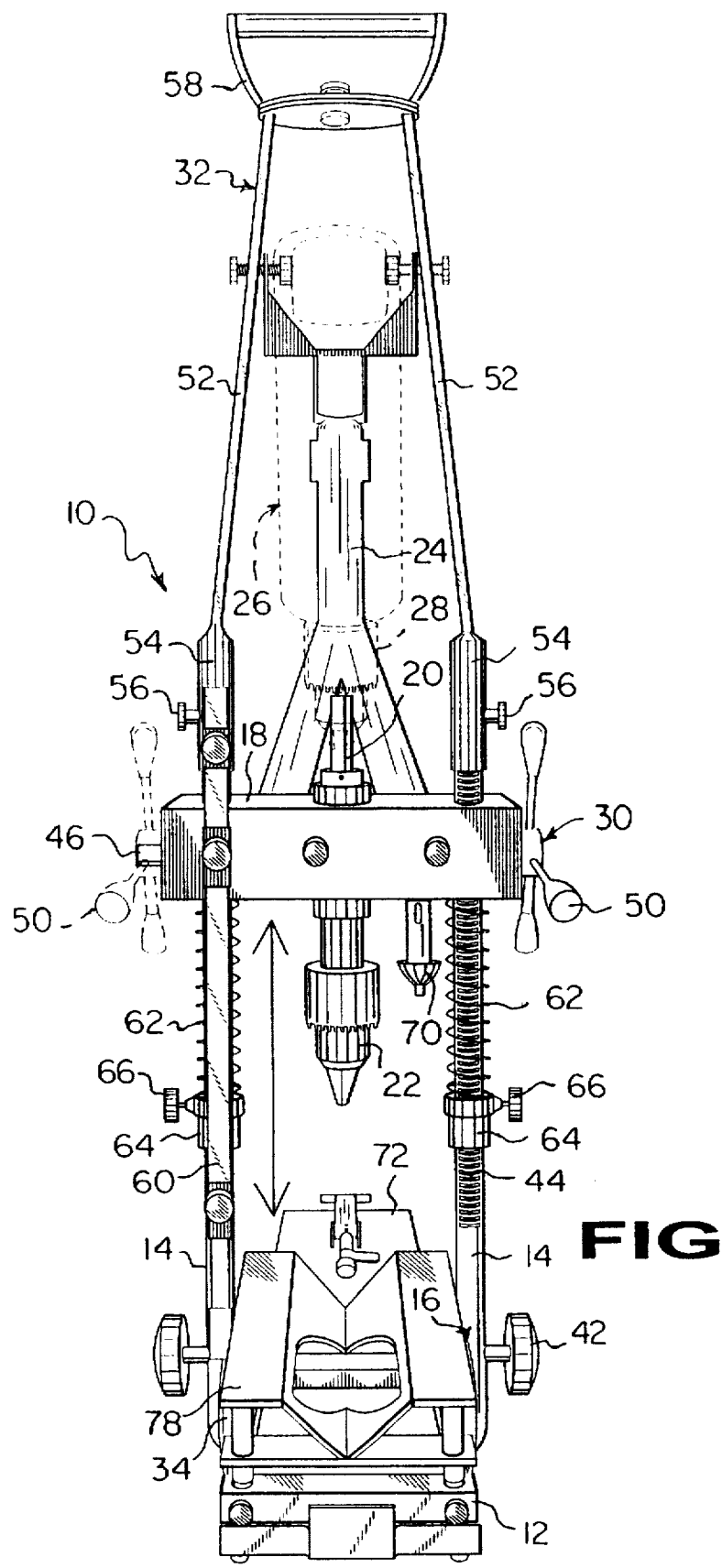

FIG. 3C is a front perspective view of the entire instant invention, showing the horizontal bracket holder mounted on the top of the base and the platform mounted to the bottom of the base.

Figure 3D:
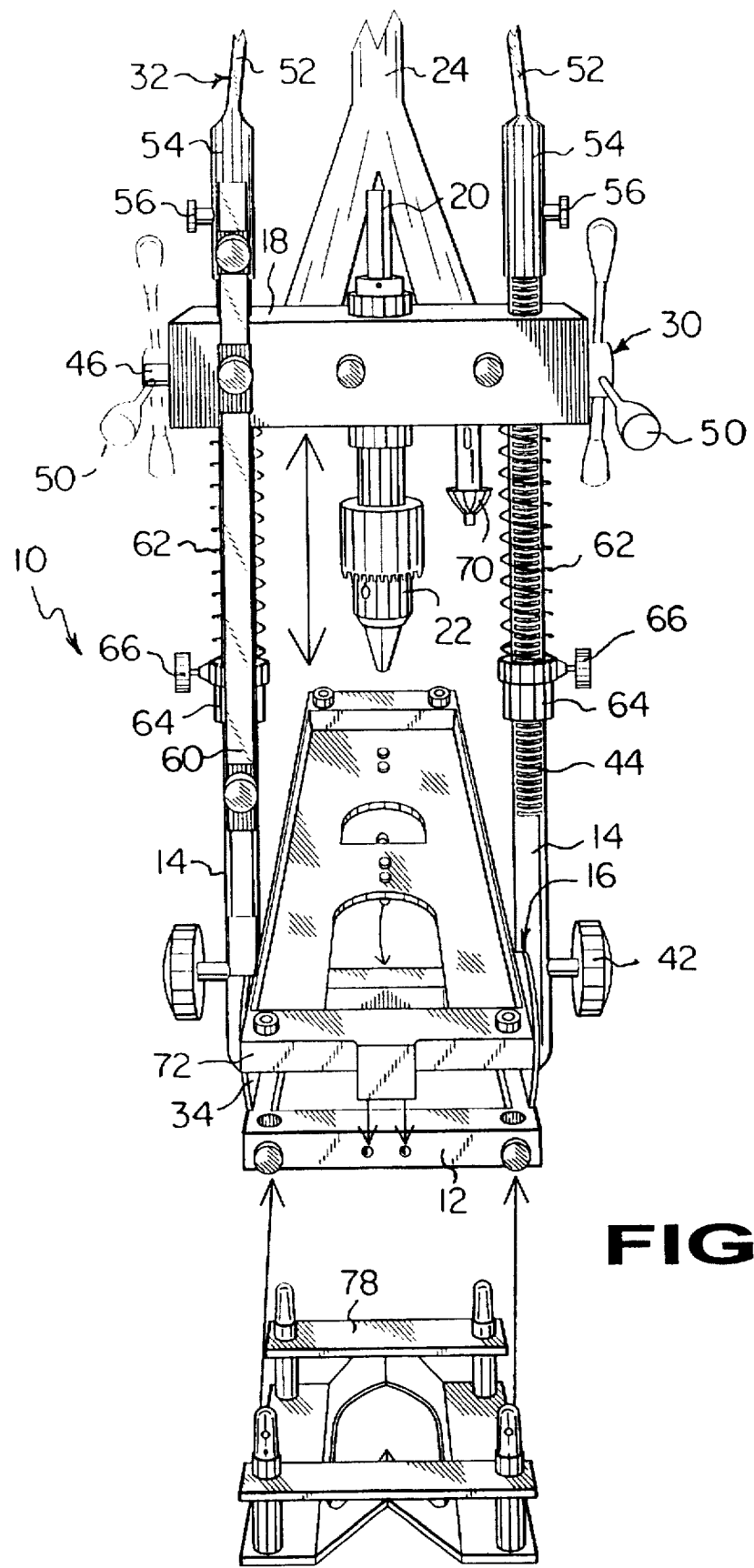

FIG. 3D is a front perspective view of the instant invention with the upper portion broken away, showing the platform inverted ready to be mounted to the top of the base and the horizontal bracket holder inverted ready to be mounted to the bottom of the base.

Figure 3E:
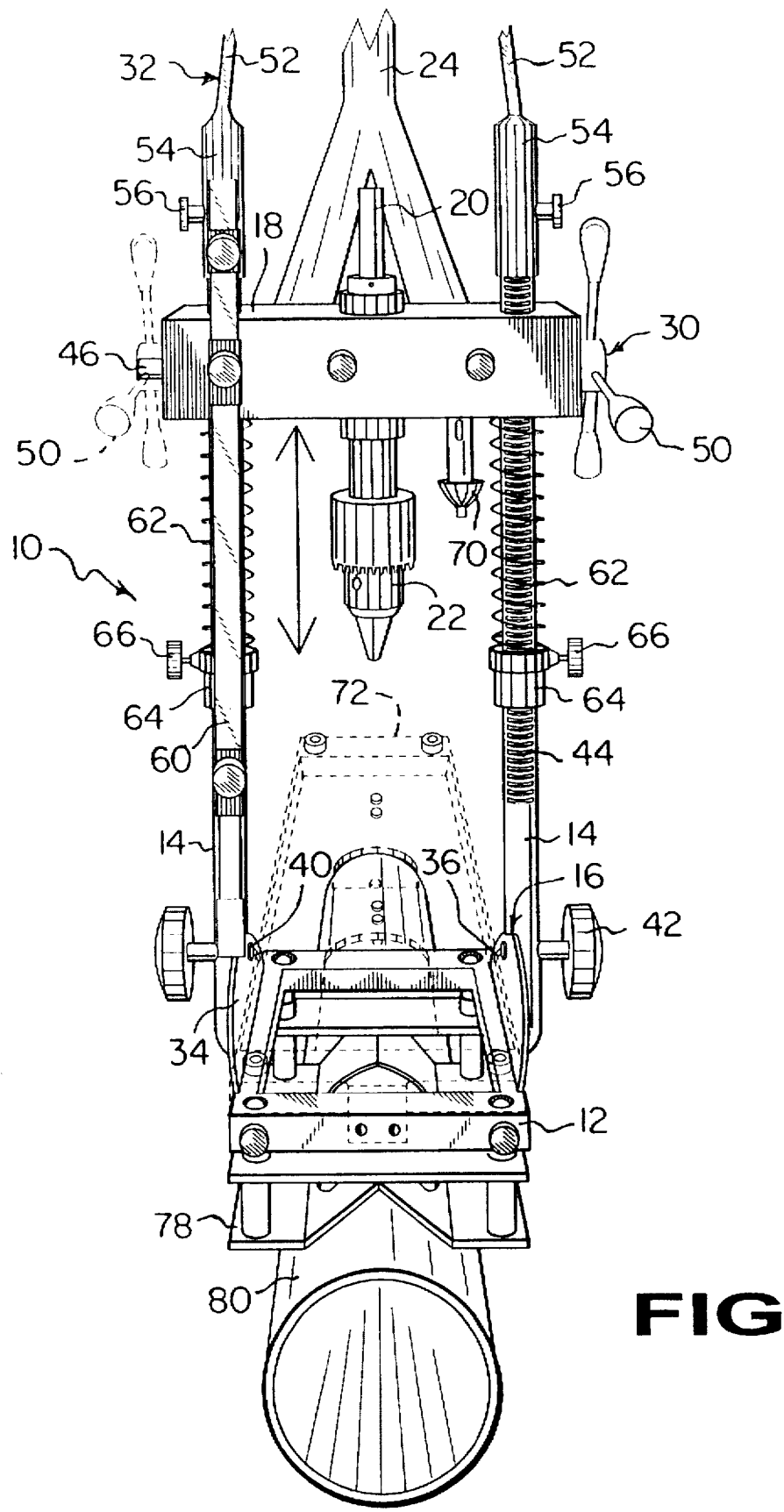

FIG. 3E is a front perspective view similar to FIG. 3D, showing the platform inverted and in phantom, mounted to the top of the base and the horizontal bracket holder inverted and mounted to the bottom of the base over a horizontal cylindrical shaped hollow work stock piece.

FIG. 4A is a top perspective view of a vertical bracket clamp assembly for cylindrical shaped work stock pieces.

Figure 4B:
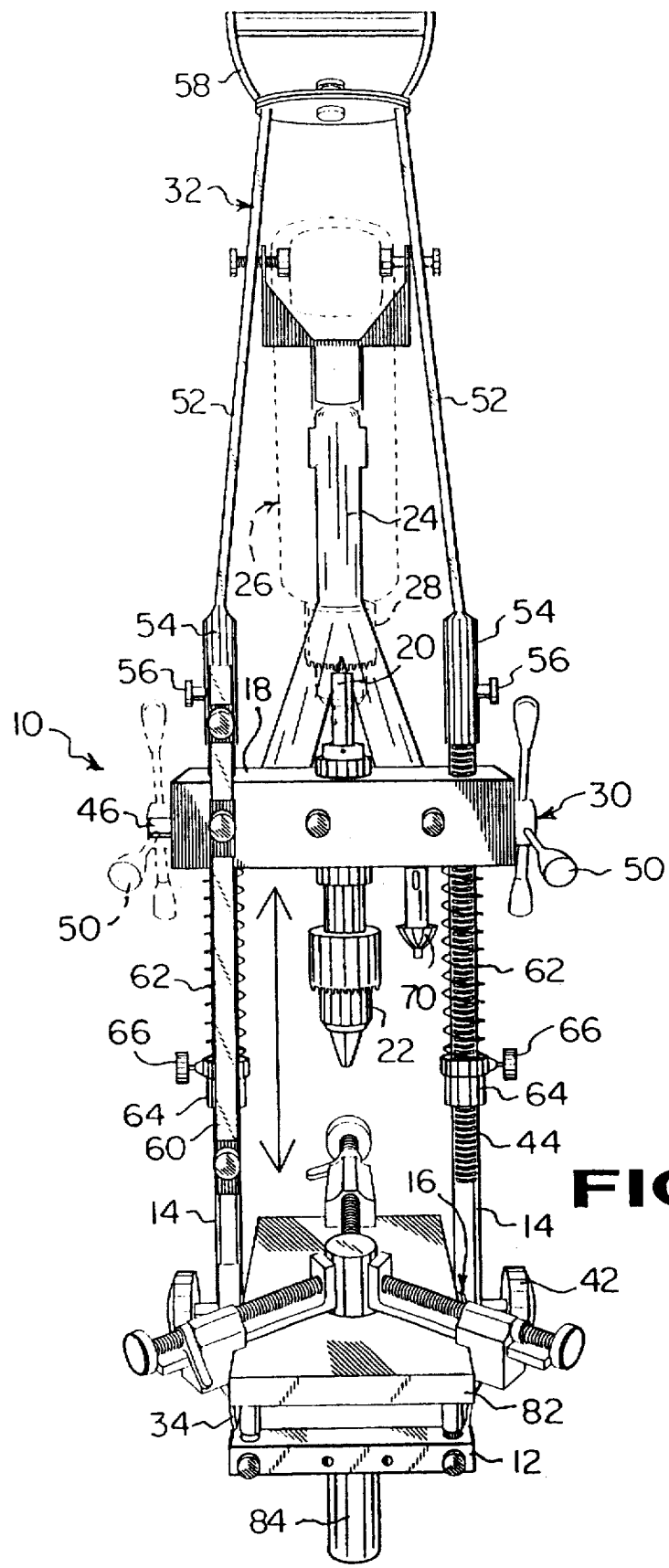

FIG. 4B is a front perspective view of the entire instant invention, showing the vertical bracket clamp assembly mounted on the top of the base holding a cylindrical shaped solid work stock piece vertically thereto.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1A to 4B illustrate a universal drill guide 10 comprising a base 12 being a frame-like configuration having a large central opening. A pair of elongated columns 14 are provided. A structure 16 is for pivotally mounting lower ends of the elongated columns 14 parallel to opposite sides of the base 12, so that the elongated columns 14 can go from upright positions to angled positions. A cross slide 18 rides upon the elongated columns 14. A bearing spindle assembly 20 is rotatively carried centrally within the cross slide 18. A guide chuck 22 is connected to the bearing spindle assembly 20 above the base 20.

An adjustable cradle 24 is affixed to the cross slide 18 to hold an electric drill 26 in a stationary position, so that the drill chuck 28 can engage with the bearing spindle assembly 20 above the cross slide 18. A facility 30 is between the cross slide 18 and the elongated columns 14, for moving the cross slide 18 up and down on the elongated columns 14. A handle assembly 32 extends upwardly from the elongated columns 14 to allow a person to grip the handle assembly 32 when operating the universal drill guide 10, so as to drill vertical and angled holes in different shaped work pieces.

The pivotally mounting structure 16 consists of a pair of semi-circular plates 34. Each plate 34 having a curved slot 36 therethrough is affixed in an upright position on an opposite side of the base 12. A first pair of bolts 38 are provided. Each first bolt 38 extends through a lower end of one elongated column 14 and into one opposite side of the base 12 below one plate 34, to allow the elongated column 14 to pivot. A second pair of bolts 40 are provided. Each second bolt 40 will extend through one curved slot 36 in the plate 34 and into one elongated column. A pair of lock knobs 42 are also provided. Each lock knob 42 engages with one second bolt 40 to lock the elongated column 14 to the plate 34.

The moving facility 30 includes each elongated column 14 having a built-in vertical rack 44 therealong. A rotatable horizontal shaft 46 is carried within the cross slide 18. A pair of pinions 48 are carried on the shaft 46 to engage with the racks 44 on the elongated columns 14. A rotatable handle 50 is connected to one end of the shaft 46 extending from the cross slide 18. When the rotatable handle 50 is turned, the pinions 48 will rotate on the racks 44 to move the cross slide 18 up and down on the elongated columns 14.

The handle assembly 32 comprises a pair of arms 52 and a pair of socket sleeves 54. Each socket sleeve 54 is on a lower end of one arm 52, to engage with an upper end of one elongated column 14. A pair of setscrews 56 are provided. Each setscrew 56 is threaded transversely into one socket sleeve 54, to secure the socket sleeve 54 on the upper end of one elongated column 14. A rotatable handgrip 58 extends between upper ends of the arm 52, to be grasped by a hand of a person operating the universal drill guide 10.

A depth control assembly 60 is mounted between one elongated column 14 adjacent a lower end and the cross slide 18, so as to limit the movement of the cross slide 18 upon the elongated columns 14. A pair of springs 62 are provided. Each spring 62 is on one elongated column 14 below the cross slide 18. A pair of collars 64 are also provided. Each collar 64 is on the elongated column 14 below one spring 62. A pair of setscrews 66 are also provided. Each setscrew 66 is threaded transversely into one collar 64 to secure the collar 64 to the elongated column 14, whereby the combination of the collars 64 secured to the columns 14, set screws 66 and springs 62 bias the cross slide 18 upwardly on the elongated columns 14.

A chuck key holder 68 is secured to the underside of the cross slide 18 to keep a chuck key 70 in place. When needed, the chuck key 70 can be removed from the holder 68 to loosen and tighten the guide chuck 22 and the drill chuck 28. An elongated platform 72 can be removably attached to a top surface and a bottom surface of the base 12, to stabilize a work piece thereon.

A horizontal bracket clamp assembly 74, as shown in FIGS. 2A to 2F, can be removably attached to the top surface and the bottom surface of the base 12 in conjunction with the elongated platform 72, to hold a rectangular shaped work stock piece 76 horizontally thereto. A horizontal bracket holder 78, as shown in FIGS. 3A to 3E, can be removably attached to the top surface and the bottom surface of the base 12 in conjunction with the elongated platform 72, to hold a cylindrical shaped hollow work stock piece 80 horizontally thereto.

Figure 1B:
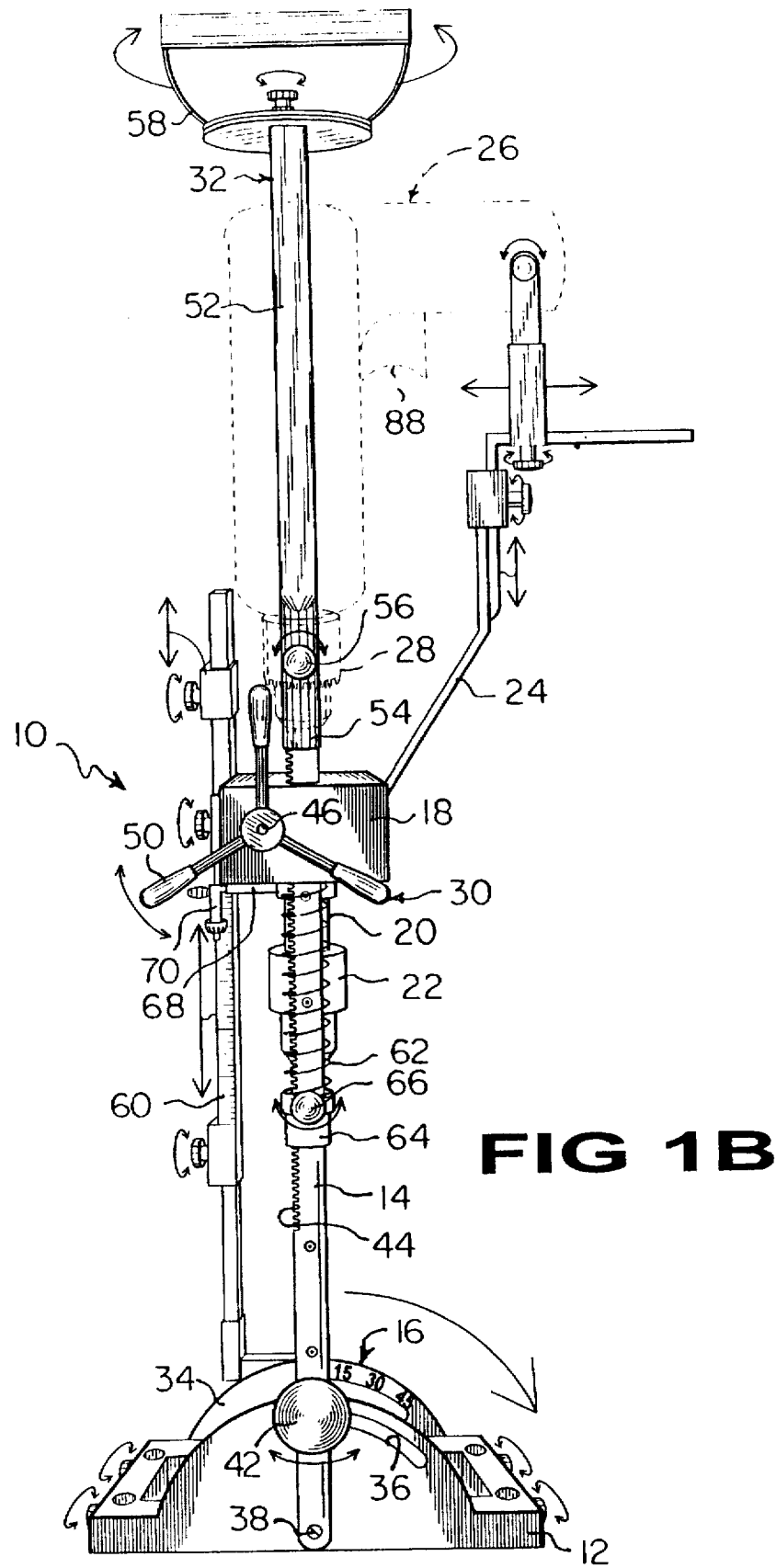
FIG. 1B is a side perspective view taken in the direction of arrow 1B in FIG. 1A.
Figure 1C:
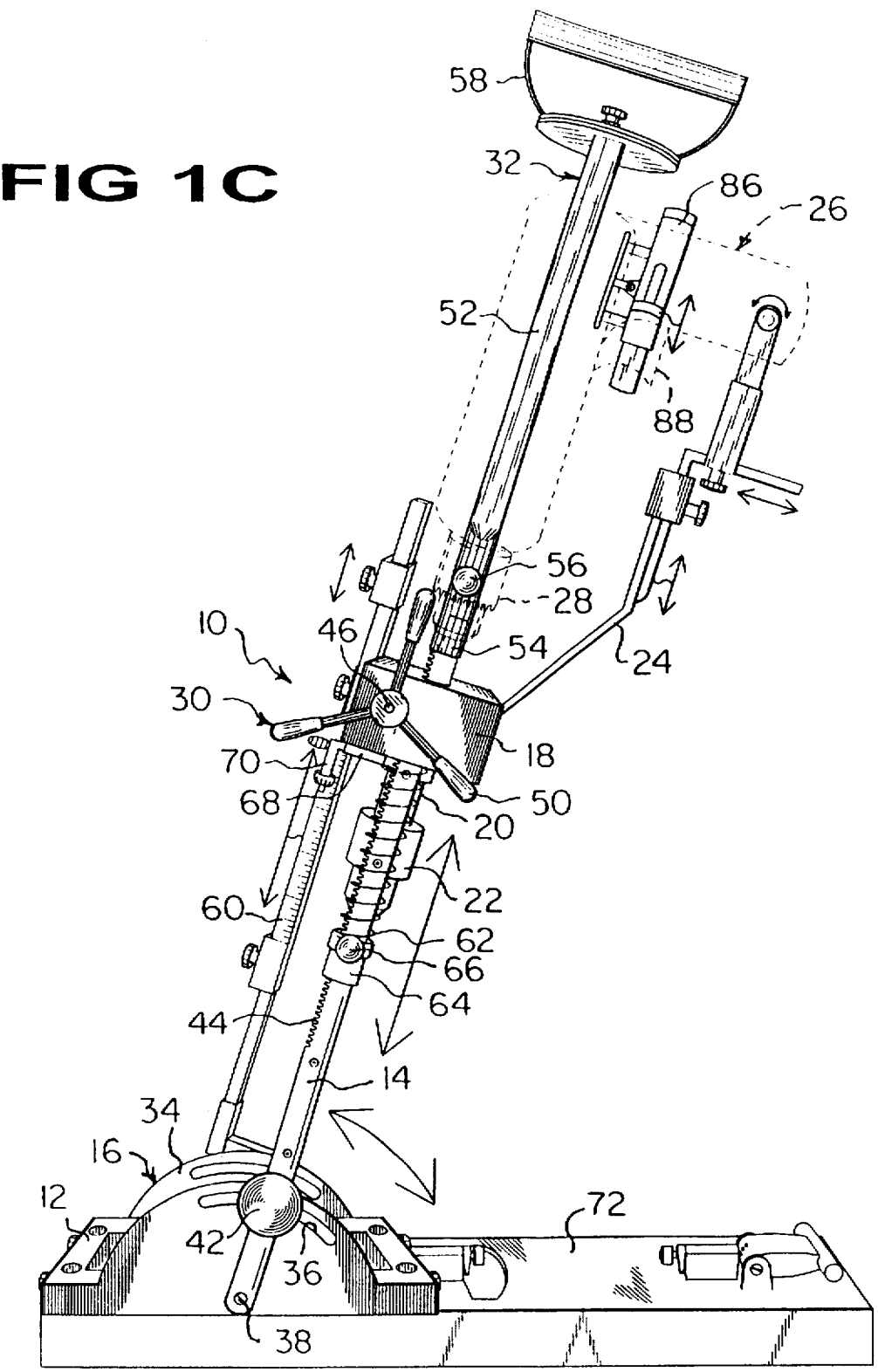
FIG. 1C is a side perspective view similar to FIG. 1B with the platform mounted thereto and the instant invention tilted to drill an angular hole.

A vertical bracket clamp assembly 82, as shown in FIGS. 4A and 4B, can be removably attached to a top surface of the base 12, to hold a cylindrical spaced solid work stock piece 84 vertically thereto. An adjustable trigger holder 86, as shown in FIG. 1C, can be attached to a trigger 88 of the electric drill 26, so that the adjustable trigger holder 86 will variably depress the trigger 88 to operate the electric drill 26.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A universal drill guide comprising:
   a) a base being a frame-like configuration having a large central opening;
   b) a pair of elongated columns, each said elongated column having a built-in vertical rack therealong;
   c) means for pivotally mounting lower ends of said elongated columns parallel to opposite sides of said base, so that said elongated columns can go from upright positions to angled positions;
   d) a cross slide which rides upon said elongated columns;
   e) a bearing spindle assembly rotatively carried centrally within said cross slide;
   f) a guide chuck connected to said bearing spindle assembly above said base;
   g) an adjustable cradle affixed to said cross slide to hold an electric drill in a stationary position, so that the drill chuck can engage with said bearing spindle assembly above said cross slide;
   h) means between said cross slide and said elongated columns, for moving said cross slide up and down on said elongated columns; and
   i) a handle assembly extending upwardly from said elongated columns to allow a person to grip said handle assembly when operating said universal drill guide, so as to drill vertical and angled holes in different shaped work pieces, wherein said moving means comprising a rotatable horizontal shaft carried within said cross slide; a pair of pinions carried on said shaft to engage with said racks on said elongated columns; and a rotatable handle connected to one end of said shaft extending from said cross slide, so that when said rotatable handle is turned, said pinions will rotate on said racks to move said cross slide up and down on said elongated columns.

2. A universal drill guide as recited in claim 1, wherein said pivotally mounting means includes:
   a) a pair of semi-circular plates, in which each said plate having a curved slot therethrough is affixed in an upright position on an opposite side of said base;

b) a first pair of bolts, in which each said first bolt extends through a lower end of one said elongated column and into one opposite side of said base below one said plate to allow said elongated column to pivot;

c) a second pair of bolts, in which each said second bolt will extend through one curved slot in said plate and into one said elongated column; and d) a pair of lock knobs, in which each said lock knob engages with one said second bolt to lock said elongated column to said plate.

3. A universal drill guide as recited in claim 1, wherein said handle assembly includes:

a) a pair of arms;

b) a pair of socket sleeves, in which each said socket sleeve is on a lower end of one said arm to engage with an upper end of one said elongated column;

c) a pair of setscrews, in which each said setscrew is threaded transversely into one said socket sleeve to secure said socket sleeve on the upper end of one said elongated column; and d) a rotatable handgrip extending between upper ends of said arms to be grasped by a hand of a person operating said universal drill guide.

4. A universal drill guide as recited in claim 1, further including a depth control assembly mounted between one said elongated column adjacent a lower end and said cross slide, so as to limit the movement of said cross slide upon said elongated columns.

5. A universal drill guide as recited in claim 1, further including:

a) a pair of springs, in which each said spring is on one elongated column below said cross slide;

b) a pair of collars, in which each said collar is on said elongated column below one said spring; and c) a pair of set screws, in which each said set screw is threaded transversely into one said collar to secure said collar to said elongated column, whereby the combination of the collars secured to the columns, set screws and springs bias said cross slide upwardly on said elongated columns.

6. A universal drill guide as recited in claim 1, further including a chuck key holder secured to the underside of said cross slide to keep a chuck key in place, so that when needed the chuck key can be removed from said holder to loosen and tighten said guide chuck and the drill chuck.

7. A universal drill guide as recited in claim 1, further including an elongated platform that can be removably attached to a top surface and a bottom surface of said base to stabilize a work piece thereon.

8. A universal drill guide as recited in claim 7, further including a horizontal bracket clamp assembly, that can be removably attached to the top surface and the bottom surface of said base in conjunction with said elongated platform, to hold a rectangular shaped work stock piece horizontally thereto.

9. A universal drill guide as recited in claim 7, further including a horizontal bracket holder, that can be removably attached to the top surface and the bottom surface of said base in conjunction with said elongated platform, to hold a cylindrical shaped hollow work stock piece horizontally thereto.

10. A universal drill guide as recited in claim 1, further including a vertical bracket clamp assembly, that can be removably attached to a top surface of said base, to hold a cylindrical shaped solid work stock piece vertically thereto.

11. A universal drill guide as recited in claim 1, further including an adjustable trigger holder to be attached to a trigger of the electric drill, so that said adjustable trigger holder will variably depress the trigger to operate the electric drill.

* * * * *